Nov. 8, 1960  MAMORU HARADA  2,959,093
ELECTRICAL EXPOSURE METER FOR PHOTOGRAPHIC CAMERA
Filed May 29, 1958

United States Patent Office 2,959,093
Patented Nov. 8, 1960

2,959,093

ELECTRICAL EXPOSURE METER FOR PHOTOGRAPHIC CAMERA

Mamoru Harada, 12—2 Sakaecho, Nakano-ku, Tokyo, Japan

Filed May 29, 1958, Ser. No. 738,853

Claims priority, application Japan Mar. 29, 1958

3 Claims. (Cl. 88—23)

This invention relates to an electrical photographic camera, and specifically to that as employed when motion pictures are taken after unnecessary turret lens of a photographic camera having been detached, a set screw of said lens being secured onto a threaded projection of an attachment.

The present invention lies in such a device as apparent from above descriptions, wherein an outer cylindrical body of the electrical exposure meter is provided with bolts along an outer periphery at the rear end, said bolt being screwed along the inner screw thread of the attachment and a threaded projection for engaging with turret lens hole is arranged at the middle of end faces of the attachment. In such a construction, the usually necessary exposure meter attachment for the photographic camera has become unnecessary; and particularly, since the lens of a photocell holding cylinder of the exposure meter is directed to the objective body to be photographed, simultaneously with said lens of the photographic camera, by screwing the electrical exposure meter according to the present invention in the securing threaded hole of the turret lens of the motion picture photographic camera indicators of the exposure meter act at the same time, thereby enabling to attain an appropriate magnitude of exposure, thus leading to a quick photographing of motion pictures. Moreover, as the exposure meter having always the turret lens of the camera secured thereto, there is no fear of allowing a precision exposure meter to fall down. Therefore, the exposure meter according to this application is advantageously convenient to carry and has a good appearance too.

Further, according to this invention, as obvious from the foregoing description the attachment is divided in a revolving holder having inner screw threads for engaging with corresponding screw threads along the outer periphery at the rear end of the outer cylindrical body and an attachable engaging body having a screw threaded projection at the center of the end face thereof for engaging with turret lens, which are held to engage with an inner flange portion of said attachable engaging body by means of the lower flange of said revolving holder 3. When the electrical exposure meter according to the present invention is to be fitted to the turret lens of photographic camera, the screw threaded projection of the attachment is fixed by engaging said projection in a securing hole for turret lens, and a peep hole for the exposure magnitude is positioned for ready measurement of the exposure magnitude. Thereafter, when the revolving holder of the attachment is revolved to engage with the screw thread along the outer periphery at the rear end of the outer cylindrical body, the lower end flange of the revolving holder and the inner flange portion 7 will be stopped, and thereby said peep window can be prevented by engaging screw threads from being fixed at an unsuitable position for determining the exposure magnitude, and moreover, when a screw threaded projection of revolving holder of attachment is not suitable to a threaded hole for a turret lens, the attachment is detached from the outer cylindrical body, and if exchanged with the attachable engaging body equipped with a screw threaded projection which is suitable to a screw threaded hole for securing said turret lens, a single exposure meter can advantageously be used for all types of photographic camera.

In addition, according to the present invention, as apparent from the foregoing descriptions, the outer cylindrical body of an exposure meter is provided with an inner revolving body inside thereof, having a light sensitivity of film graduation at the lower portion and a light quantity graduation arranged in parallel thereto, and an engaging pin is imbedded in said revolving body, said engaging pin extending through the recess groove provided in the outer cylindrical body, said engaging pin being inserted in an engaging groove provided on the roulette. In the operation of the electrical exposure meter according to this invention, a light sensitivity graduation corresponding to the light sensitivity of film loaded is adjusted to the light sensitivity graduation peep window by revolving the roulette, whereby the film sensitivity graduation and simultaneously the light quantity graduation, both engraved in parallel to each other on the inner revolving body, can be adjusted by revolving and shifting. Therefore, the exposure magnitude can advantageously be determined in a simple operation.

Moreover, according to the present invention as apparent from the foregoing description, the present exposure meter comprises a photoelectric cell holding cylinder, the front end of which is provided screw threads. In a special photographing operation, such as 16, 32 or similar sections of films, an appropriate exposure magnitude can be advantageously obtained for respective photographing operation by using the light quantity controlling cylinder.

The present invention will be described in more detail in the following by reference to the accompanying drawings, of which Fig. 1 is a side view of the electrical exposure meter according to this invention as attached to a photographing camera;

Figure 1:
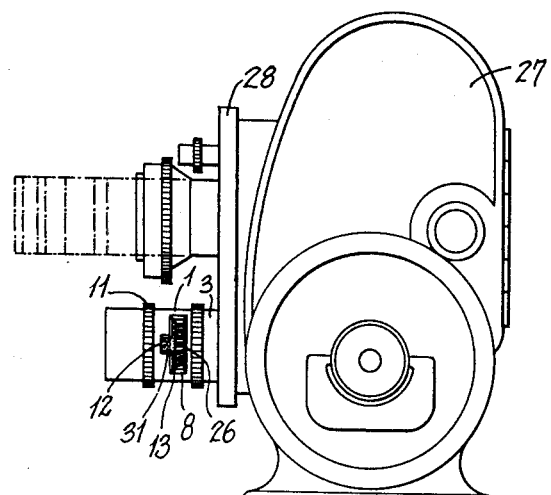
Figure 3:
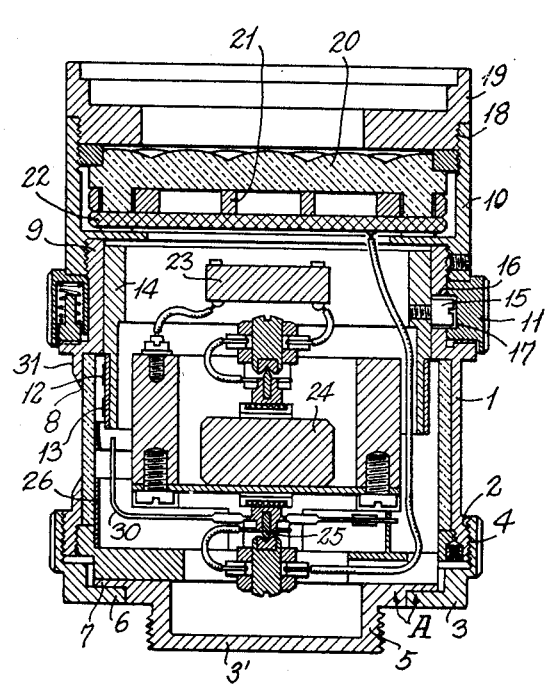
Fig. 3 is a longitudinal sectional view of the electrical exposure meter.
Figure 2:
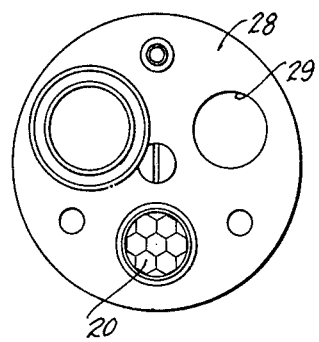
Fig. 2 is a front view of the turret portion of Fig. 1.

Referring to the accompanying drawings, in this invention, the outer periphery of the rear end of the outer cylindrical body 1 is threaded 2, the inner screw thread 4 of attachment A being screwed with said screw thread 2, and said attachment A having a screw threaded projection 5 protruded at the middle of outer end face for engaging in a turret lens hole. In such a construction, an inner screw thread 4 is engraved on the said attachment A for engaging with the screw thread 2 on the outer peripheral portion of rear end of outer cylindrical body 1, said attachment being divided in a revolving holder 3 and an attachable engaging piece 3' having a screw threaded projection 5 for engaging said piece 3' the turret lens hole at the center of its end face; an inner flange 7 of the attachable engaging piece 3' being held with the lower end flange 6 of the revolving holder 3, the photocell holding cylinder 10 being screwed with the front end 9 of the outer cylinder body 1, a roulette 11 being inserted in midway between said photocell holder 10 and said outer peripheral portion of outer cylindrical body 1, an inner revolving body 14 being provided inside the outer cylindrical body 1, having a light sensitivity graduation 12 at the lower portion of said body 14 as well as a light quantity graduation 13 engraved in parallel to said graduation 12, an engaging pin 15 being embedded in said inner revolving body 14, said engaging pin 15 extending through a recess groove 16 provided in the outer cylinder body 1, said engaging pin 15 being inserted in another engaging groove 17 engraved in said roulette 11, and a screw thread 18 being formed for screwing the light quantity controlling cylinder 19 at the front end of the photocell holding cylinder 10.

On the other hand, on one side surface of the outer cylinder body 1, there are arranged the film sensitivity graduation 12 as well as exposure magnitude peep holes 8, 31 for the light quantity graduation 13 in series. 20 represents a lens; 21 bee-hive holes; 22 a photocell; 23 a resistor; 24 a magnet; 25 pivot; 26 an exposure inducing stripe and 30 indicator.

The operation of the electrical exposure meter is carried out in such a manner that the turret lens out of operation of a photographing camera 27 is detached when motion pictures being taken, the screw-threaded projection 5 of attachment A being engaged with an unused lens mounting 29 in turret 28 of camera 27.

What I claim is:

1. An electrical exposure meter for a photographic camera comprising an outer cylindrical body externally threaded at its rear end, a photoelectric cell in the front of said cylindrical body, a light meter carried rearwardly of said photoelectric cell for measuring the light falling on said cell, a cap-like attachment having an outwardly extending annular flange for closing the rear end of said outer cylindrical body, said attachment also having a coaxial projection of reduced diameter extending rearwardly thereof and externally threaded for engagement with an internally threaded turret lens hole of the camera, and an internally threaded bushing adapted to screw upon the external threads of said outer cylindrical body and having an inwardly extending annular flange for engaging the flange of said attachment to hold the attachment closely against the end of said outer cylindrical body.

2. An electrical exposure meter according to claim 1, wherein said outer cylindrical body has an opening therein, an inner revoluble body is disposed within said outer cylindrical body, a film-light sensitive graduation and a light quantity graduation arranged in parallel therewith are carried by said inner revoluble body adjacent the rear end thereof as a part of said light meter, an engaging pin is fixed to said inner revoluble body projecting through the opening in said outer cylindrical body, and a roulette is carried by said outer cylindrical body rotatable with respect thereto and having an engaging groove coacting with said pin to shift the position of said inner revoluble body.

3. An electrical exposure meter for a photographic camera comprising an outer cylindrical body externally threaded at its rear end, a photocell holding cylinder carried by the forward end of said outer cylindrical body, and a light quantity control tube threadedly connected at the forward end of said photocell holding cylinder, in combination with a photoelectric cell disposed within said photocell holding cylinder, a light meter carried rearwardly of said photoelectric cell for measuring the light falling on said cell, a cap-like attachment having an outwardly extending annular flange for closing the rear end of said outer cylindrical body, said attachment also having a coaxial projection of reduced diameter extending rearwardly thereof and externally threaded for engagement with an internally threaded turret lens hole of the camera, and an internally threaded bushing adapted to screw upon the external threads of said outer cylindrical body and having an inwardly extending annular flange for engaging the flange of said attachment to hold the attachment closely against the end of said outer cylindrical body.

References Cited in the file of this patent

UNITED STATES PATENTS

| | | |
|---|---|---|
| 2,427,125 | Dinsmore | Sept. 9, 1947 |
| 2,472,732 | Stillwell | June 7, 1949 |

OTHER REFERENCES

"Automatic Exposure Control," Bruck et al., Photographic Engineering, vol. 3, No. 1, 1952 pages 1–11, (pages 10 and 11 only relied on).